United States Patent
Noor

(10) Patent No.: US 9,986,402 B2
(45) Date of Patent: May 29, 2018

(54) COMMANDEERING WIRELESS ACCESS POINTS DURING EMERGENCIES

(71) Applicant: T-Mobile U.S.A., Inc., Bellevue, WA (US)

(72) Inventor: Mohammad Jamil Noor, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 15/273,642

(22) Filed: Sep. 22, 2016

(65) Prior Publication Data

US 2018/0084395 A1    Mar. 22, 2018

(51) Int. Cl.
| | | |
|---|---|---|
| *H04W 4/22* | (2009.01) | |
| *H04W 88/06* | (2009.01) | |
| *H04W 12/06* | (2009.01) | |
| *H04W 76/02* | (2009.01) | |
| *H04W 16/14* | (2009.01) | |
| *H04W 84/12* | (2009.01) | |

(52) U.S. Cl.
CPC ............ *H04W 4/22* (2013.01); *H04W 76/02* (2013.01); *H04W 12/06* (2013.01); *H04W 16/14* (2013.01); *H04W 84/12* (2013.01); *H04W 88/06* (2013.01)

(58) Field of Classification Search
CPC ....... H04W 4/22; H04W 12/06; H04W 84/12; H04W 16/14
USPC ....... 455/404.1, 404.2, 508, 410, 411, 435.1, 455/26.1, 426.2, 432.2, 524, 211.2; 340/539.18, 691.3, 7.48, 5.81
See application file for complete search history.

(56) References Cited

U.S. PATENT DOCUMENTS

| | | | |
|---|---|---|---|
| 2004/0095954 A1* | 5/2004 | Varney | H04W 4/00 370/444 |
| 2006/0025154 A1* | 2/2006 | Alapuranen | H04W 4/02 455/456.1 |
| 2013/0091452 A1* | 4/2013 | Sorden | G06F 3/048 715/771 |
| 2013/0135097 A1* | 5/2013 | Doezema | G08B 21/0446 340/539.13 |
| 2015/0058125 A1* | 2/2015 | Moshfeghi | G06Q 20/20 705/14.58 |
| 2015/0182857 A1* | 7/2015 | Kuo | H04L 67/26 345/420 |
| 2017/0135138 A1* | 5/2017 | Zhou | H04W 76/021 |
| 2017/0164174 A9* | 6/2017 | Daly | H04W 4/22 |

* cited by examiner

Primary Examiner — Inder Mehra
(74) Attorney, Agent, or Firm — Perkins Coie LLP

(57) ABSTRACT

Systems and methods are described herein for providing emergency personnel and other users access to a communications network during an emergency situation, event, or scenario. In some embodiments, the systems and methods provide mobile devices with access to a communications network during an emergency situation, by receiving, at an access point to the communications network, a request from a mobile device to connect to the communications network via the access point, determining the request includes user credentials associated with authorizing a user of the mobile device to use services provided by the communications network during the emergency situation, and connecting the mobile device to the communications network via the access point based on the user credentials.

17 Claims, 4 Drawing Sheets

COMMANDEERING WIRELESS ACCESS POINTS DURING EMERGENCIES

CROSS REFERENCE TO RELATED APPLICATIONS

This application is related to U.S. patent application Ser. No. 15/273,652, filed Sep. 22, 2016, entitled PROVISIONING ACCESS POINTS TO MOBILE DEVICES FOR EMERGENCY CALLS, which is hereby incorporated by reference in its entirety.

BACKGROUND

The Nationwide Wireless Priority Service (WPS) was established to enable high-priority emergency and urgent telephone calls to be prioritized on cellular networks, especially during emergency and time-sensitive situations. For example, during an emergency, authorized personnel (e.g., first responders, law enforcement, military personnel, and so on) may avoid congested cellular networks by appending certain codes to calls placed to the networks, among other things. However, the WPS protocols suffer from various implementation drawbacks, including limitations associated with the quality of service of the cellular networks facilitating the WPS priority calling.

Although cellular coverage provided by communications networks has greatly improved, there are often locations and areas (e.g., certain geographical locations, areas within structures) of a network where the coverage is insufficient and/or inconsistent. Mobile devices at or within such locations may not be able to access the networks during emergency or urgent situations, such as when placing 911 or other emergency calls during emergencies, and/or communicating with emergency response entities or personnel, among other drawbacks.

BRIEF DESCRIPTION OF THE DRAWINGS

Embodiments of the disclosed technology will be described and explained through the use of the accompanying drawings.

Figure 1:
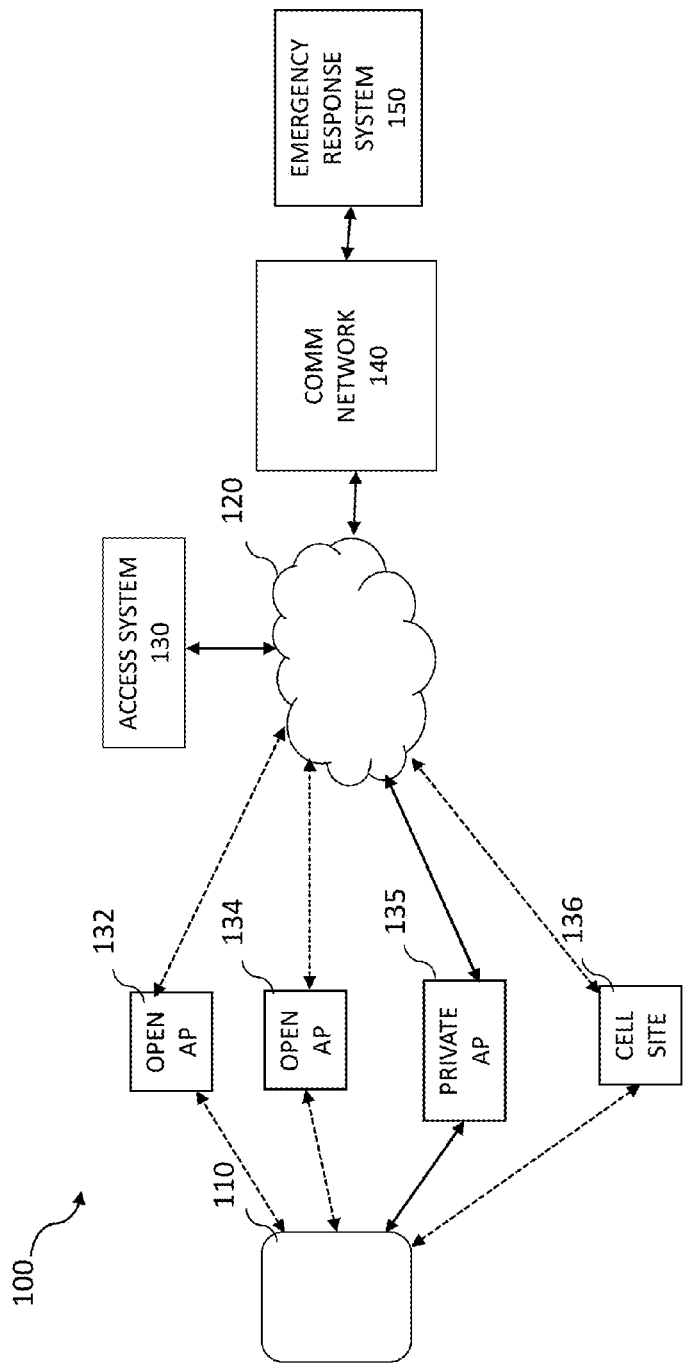
FIG. 1 is a block diagram illustrating a suitable computing environment for providing access to a network during an emergency scenario.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for providing emergency personnel and other users access to a communications network during an emergency situation, event, or scenario. For example, the systems and methods may facilitate the commandeering, by emergency personnel, of one or more wireless access networks during an emergency situation or event.

In some embodiments, the systems and methods provide mobile devices with access to a communications network during an emergency situation, by receiving, at an access point to the communications network, a request from a mobile device to connect to the communications network via the access point, determining the request includes user credentials associated with authorizing a user of the mobile device to use services provided by the communications network during the emergency situation, and connecting the mobile device to the communications network via the access point based on the user credentials.

In some embodiments, a wireless router acts as the access point, and facilitates its commandeering by emergency personnel. For example, the wireless router may include a network access system that connects mobile devices to wireless communications networks via the router (e.g., by providing a connection to the Internet via an Internet Service Provider), and a router access system that connects the mobile devices to the wireless router, where the router access system stores multiple access passwords associated with connecting the mobile devices to the wireless router, such as a first password (e.g., a router-specific password) that is determined by an owner of the wireless router, and a second password (e.g., a common or shared emergency password) that is determined by a Wireless Priority Service (WPS) or other emergency response system for enabling emergency personnel to access wireless communications networks during emergencies, catastrophic events, and other urgent or time-sensitive situations.

The systems and methods, therefore, provide, enhance the capabilities and implementation of the WPS by enabling various different communication network access points to be commandeered or otherwise provisioned during emergency, urgent, and/or time-sensitive situations or events, among other benefits.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment 100 configured to provide emergency personnel and other users access to a communications network during an emergency situation, event, or scenario. A mobile device 110 accesses a network 120 via one or more access points or cell sites, including open wireless access points 132, 134, a private or closed access point 135, a cell site 136 (e.g., a base station), which provide access networks to the network 120, such as the Internet, and so on. Via one or more of the access points or sites, the mobile device 110 may communicate with various entities and services provided by a communications network 140, such as an emergency response system 150 via the network 140.

As described herein, when the access points 132, 134 and cell site 136 are congested or otherwise unavailable, the mobile device 110 may provision the private wireless access point 135 to access the emergency response system 150 provided by the communication network 140. For example, the mobile device 110 may connect to an Internet Multimedia System (IMS) communications network via the private access point 135, and place IMS Multimedia Emergency Session (MES) calls, enhanced 911 (E911) communications, or other calls when required.

In some embodiments, an access system 130, which may be part of a server over the network 120 (as shown) and/or part of the private access point 135, facilitates the mobile device 110 being authorized to the private access point 135 during emergencies. As described herein, the access system 130 may determine the mobile device 110 is associated with an authorized or confirmed user (e.g., authorized under WPS guidelines), and connect the mobile device 110 to the private access point 135.

The private access point 135 may be part of or included by various different network components, such as wireless routers, personal hotspots, and so on. For example, the access point 135 may be a mobile device personal hotspot provided by another mobile device.

The mobile device 110, via the private access point 135, may then reliably communicate over the network 120 during an emergency, urgent, or time-sensitive situation or event, avoiding congested areas of the network environment 100, such as the open access points 132, 134, and cellular sites 136, which are likely inundated with users during such emergencies. Further details regarding the commandeering of access points during emergencies are described herein.

FIG. 1 and the discussion herein provide a brief, general description of the components of the computing environment 100. Although not required, aspects of the computing environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 110 may include network communication components that enable the devices to communicate with remote servers or other portable electronic devices by transmitting and receiving wireless signals using a licensed, semi-licensed, or unlicensed spectrum over communications network, such as the network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing LTE, 3G and/or 4G wireless protocols. If the mobile device 110 is configured to communicate over another communications network, the mobile device 110 may include other components that enable it to be identified on the other communications networks.

In some embodiments, the mobile device 110 may include components that enable them to connect to a communications network using Generic Access Network (GAN), Unlicensed Mobile Access (UMA), or LTE-U standards and protocols. For example, the mobile device 110 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE) network, or other communications network. Further, the communications network 120 may include or be part of a wireless communications network, such as an Internet Multimedia System (IMS) network or other wireless networks.

Examples of Commandeering Private Access Points During Emergencies

As described herein, in some embodiments, the systems and methods enable a mobile device 110 to commandeer or otherwise access a private access point during an emergency situation (such as during a natural disaster, terrorist attack, large accident, public health event, and so on).

Figure 2:
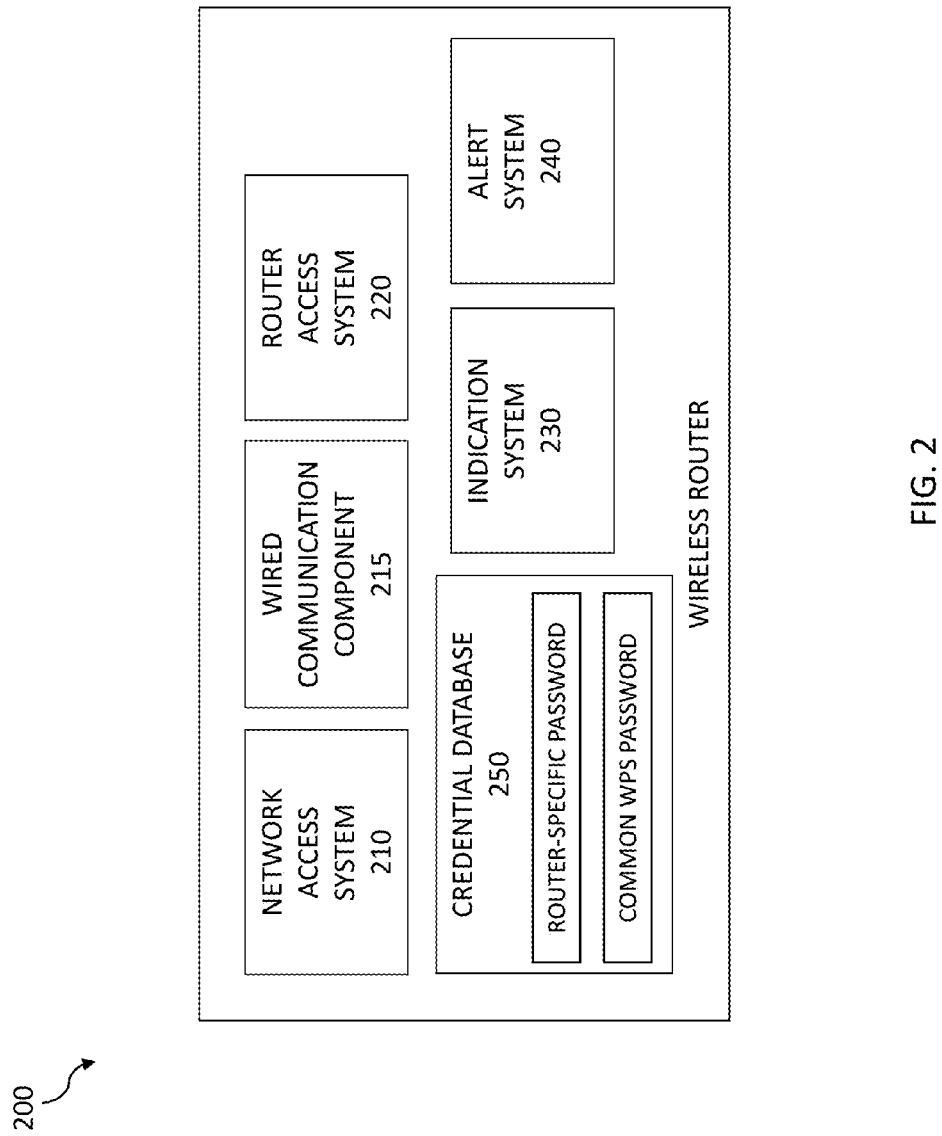
FIG. 2 is a block diagram illustrating the components of a network access system

FIG. 2 is a block diagram illustrating the components of a wireless access point, such as a wireless router 200. The access point (e.g., private wireless router) may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the wireless router 200 may include a network access system 210, a wired communications component 215, a router access system 220, an indication system 230, and an alert system 240.

In some embodiments, the network access system 210 is configured and/or programmed to provide Internet and other services to devices connected to the router 200. For example, the network access system 210, such as a wireless network access system, may include a wireless radio that permits mobile devices to wirelessly communicate with the wireless router, in order to direct communications to and from the Internet 120 via WAN ports of the router 200, acting to control and manage the data packets between the mobile device 110 and the network 120 (or, communications network 140).

In some embodiments, the wired communications component 215 permits and/or controls the communications with an external wired network, such as the Internet provided by an internet service provider (ISP).

In some embodiments, the router access system 220 is configured and/or programmed to facilitate the authorization and connection of mobile devices (e.g., mobile device 110) to the router 200. The router access system 220 may store (or obtain) one or more security passwords or credentials associated with authorizing mobile devices to connect to the router.

The router 200 stores the credentials in a credential database 250. For normal connections (e.g., connections to mobile devices associated with users known to the router 200 and/or provider of the router), the router 200 provides a router-specific password, such as security key or password used by mobile devices to connect to the router.

However, in order to authorize local or proximate users (e.g., emergency personnel), the router 200 also stores a common WPS password (or other emergency password, such as a security key or password known to and used by mobile devices to connect to any router or access point, in order to utilize the router 200 as an access to the network during emergency situations. In some cases, the common WPS password is stored in the mobile devices of authorized personnel, and, therefore, only such users may commandeer or otherwise connect to an otherwise private router, such as router 200.

Thus, by storing two different passwords, such as the router-specific password for providing normal or complete services to known mobile devices, and the common WPS password also stored by unknown or emergency personnel associated mobile devices, the router 200 is capable of controlling access to the network 120 via the router for communications during normal or non-emergency situations, while also acting as an access point (or, access network) for certain mobile devices during emergency situations.

In some embodiments, the indication system 230 is configured and/or programmed to display, or cause to be displayed, one or more indications that the router 200 is provisioned and/or being utilized for emergency services by the mobile device 110. The indication system 230 may control or change the state of one or more lights (e.g., LEDs) within a housing of the router 200, providing an indication or signal that the router is currently in use directing communications between the mobile devices of emergency personnel and the emergency response system 150.

Figure 3:
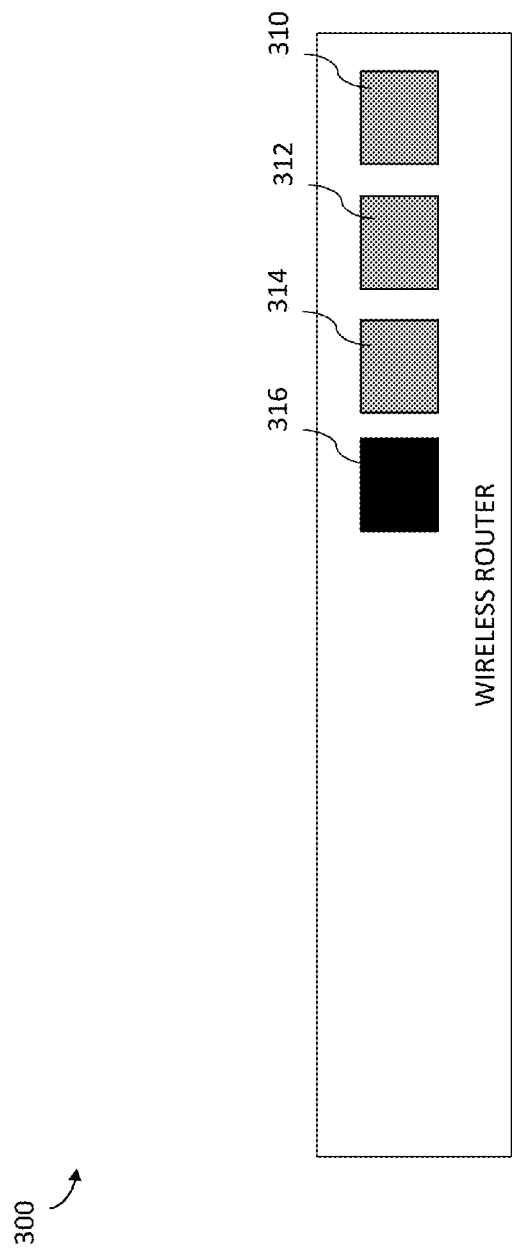
FIG. 3 is a diagram illustrating display states of a wireless router commandeered during an emergency.

FIG. 3 is a diagram illustrating display states of a wireless router 300 commandeered during an emergency. As depicted, the router 300 may include various different indicators 310-320 associated with functionality of the router 300, including an indicator 310 that represents the router 300 is powered on, an indicator 312 that represents the router 300 is connected to the Internet (network 120), and an indicator 314 that represents the router is sending/receiving data, among other displayed indicators.

In addition, the router 300, via the indication system 230, may illuminate a light or indicator 316 specific to representing the commandeering of the router 300 by the mobile device 110. In some cases, the router 300 may change the state or illumination pattern of one or more lights 316, may change the color of one or more lights 316, and so on, to indicate the commandeering of the router 300 by the mobile device 110.

Returning back to FIG. 2, in some embodiments, the alert system 240 is configured and/or programmed to transmitting an alert to the emergency response system 150 associated with the communications network 140, which indicates the mobile device 110 is communicating over the communications network via the private access point 135. For example, the alert system 240 may send an alert and various associated information, such as identification information (e.g., IMSI) for the mobile device 110, information identifying a location of the mobile device 110, information associated with the router 135 or access point, and so on.

As described herein, the private access point 135, via the access system 130, may perform various operations or functions for connecting to mobile devices during emergency situations.

Figure 4:
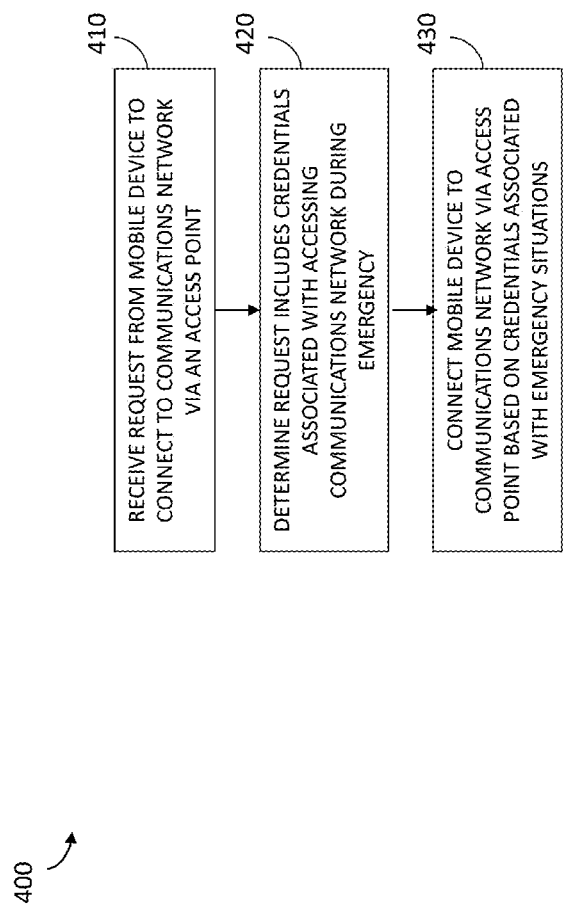
FIG. 4 is a flow diagram illustrating a method for connecting a user to a network during an emergency scenario.

FIG. 4 is a flow diagram illustrating a method 400 for connecting a user to a network during an emergency scenario. The method 400 may be performed by the private access point 135 and, accordingly, is described herein merely by way of reference thereto. It will be appreciated that the method 400 may be performed on any suitable hardware.

In operation 410, the access point 135 receives a request from the mobile device 110 to connect to the communications network 140 via the access point 135. For example, during an emergency, the mobile device 110 may transmit a request to connect to the access point 135 that includes an identifier (e.g., IMSI) for the mobile device 110, and a stored WPS password for connecting to access points during emergency situations. In some cases, the WPS password is provided to the mobile device 110 when the device is associated with an authorized user and/or provided when the user becomes authorized by one or more WPS entities.

In operation 420, the access point 135 determines the request includes user credentials associated with authorizing a user of the mobile device to use services provided by the communications network during the emergency situation. For example, the access point 135 may match a password within the user credentials with a password stored by the wireless router that is a common password (e.g., WPS password contained in database 250) associated with authorizing mobile devices to access points during emergency situations.

In some cases, the access point 135 may be part of a mesh of access points. In such cases, the access point 135 matches the password within the user credentials with a password stored by a mesh of wireless APs that is a common password associated with authorizing mobile devices to access points during emergency situations, and connects the mobile device 110 to one of the access points within the mesh of access points.

In some cases, the access point 135 may prioritize certain devices having access. For example, the access point 135, via the router access system 220, may prioritize access by mobile devices based on a variety of factors. The access point 135 may receive multiple additional requests from multiple additional mobile devices to connect to the communications network via the access point, determine the requests includes user credentials associated with authorizing users of mobile devices to use services provided by the communications network during the emergency situation as well as information identifying priority access levels for the users associated with the mobile devices; and connect the multiple additional mobile devices to the communications network via the access point based on the user credentials and based on the identified priority access levels for the users associated with the mobile devices.

For example, the access point 135 may connect all of the multiple additional mobile devices to the communications network via the access point when a total number of connected mobile devices is less than a maximum allowable number of connected mobile devices. Alternatively or additionally, the access point may connect one or more higher access priority mobile devices to the communications network via the access point when the total number of connected mobile devices is at or greater than a maximum allowable number of connected mobile devices.

In operation 430, the access point 135 connects to the mobile device 110 based on the user credentials. Once connected, the access point 135 may display an indicator that represents the AP 135 has facilitated the connection of the mobile device 110 to the communications network 140 via the AP 135. Alternatively or additionally, the access point 135 may change a display mode of an indicator presented by the AP 135 that represents the AP 135 has facilitated the connection of the mobile device 110 to the communications network 140, among other displayed indicia.

In some cases, the access point 135 may authorize the mobile device 110 to use certain limited services provided by the communications network, such as voice or message-based communications used during emergencies, while still preventing other services, such as data services, from being provided to the mobile device 110.

As described herein, in some embodiments, the access point 135 may transmit an alert to the emergency response system 150 associated with the communications network 140 that provides information associated with the connection of the mobile device 110 to the communications network via the AP 135 during the emergency situation. Example information provided to the system 150 includes information identifying the mobile device 150, information identifying the location or owner of the access point 135, information identifying the GPS location of the mobile device 110, and so on.

The systems and methods may be deployed to a network in a variety of ways. For example, a new wireless router (e.g., router 200) may be configured to allow ubiquitous access of emergency services to unknown or other mobile devices before being deployed to customers. In other cases, previously deployed routers may receive software patches or updates that include the common WPS password or other information that configures the routers to provide the systems and methods described herein.

Thus, in some embodiments, a new or previously deployed wireless router may include: a network access system that connects mobile devices to wireless communications networks, and a router access system that connects the mobile devices to the wireless router, where the router access system stores multiple access passwords associated with connecting the mobile devices to the wireless router, including a first password that is determined by an owner of the wireless router, and a second password that is determined by a Wireless Priority Service (WPS) for enabling emergency personnel to access wireless communications networks during emergencies.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A wireless router, comprising:
   at least one processor;
   memory coupled to the at least one processor;
   a wired communications component, coupled to the processor, and permitting communications with an external network;
   a wireless radio that permits mobile devices to wirelessly communicate with the wireless router;
   a router access component, stored in the memory and executed by the processor, that connects the mobile devices to the wireless router,
      wherein the router access component stores multiple access passwords associated with connecting the mobile devices to the wireless router, including:
         a first password that is determined by an owner of the wireless router; and
         a second password that is determined by a Wireless Priority Service (WPS) for enabling emergency personnel mobile devices to wirelessly communicate with the wireless router during emergencies; and
   an indication system that changes a display pattern of status lights of the wireless router to indicate one or more mobile devices are connected to the wireless router during an emergency.

2. The wireless router of claim 1, wherein the second password is a common password stored by all wireless routers of a group of wireless routers, and wherein the wireless radio operates on unlicensed spectrum, and wherein the external network couples to a telecommunications network using the Internet Protocol.

3. The wireless router of claim 1, further comprising:
   an alert system that transmits an alert from the wireless router to an emergency response system associated with the communications network that provides information associated with a connection one or more mobile devices to the communications network via the wireless router during an emergency situation.

4. A method for providing a mobile device with access to a communications network during an emergency situation, the method comprising:
   receiving, at an access point to the communications network, a request from the mobile device to connect to the communications network via the access point;
   determining the request includes user credentials associated with authorizing a user of the mobile device to use services provided by the communications network during the emergency situation by matching a password within the user credentials with a password stored by the access point that is a common password associated with authorizing mobile devices to access points during emergency situations; and
   connecting the mobile device to the communications network via the access point based on the user credentials.

5. The method of claim 4, wherein the access point is a wireless router that uses unlicensed spectrum, and
   wherein the mobile phone is a dual mode phone capable of operating on licensed spectrum via a cellular telephone network and on the unlicensed spectrum via an IEEE 802.11 protocol.

6. The method of claim 4, wherein determining the request includes user credentials associated with authorizing the user of the mobile device to use services provided by the communications network during the emergency situation includes matching a password within the user credentials with a password stored by a mesh of wireless routers that is a common password associated with authorizing mobile devices to access points during emergency situations; and
   wherein connecting the mobile device to the communications network via the access point based on the user credentials includes connecting the mobile device to a wireless router of the mesh of wireless routers.

7. The method of claim 4, further comprising:
   receiving, at the access point to the communications network, multiple additional requests from multiple additional mobile devices to connect to the communications network via the access point;
   determining the requests includes user credentials associated with authorizing users of mobile devices to use services provided by the communications network during the emergency situation as well as information identifying priority access levels for the users associated with the mobile devices; and
   connecting the multiple additional mobile devices to the communications network via the access point based on the user credentials and based on the identified priority access levels for the users associated with the mobile devices, including:
      connecting all of the multiple additional mobile devices to the communications network via the access point when a total number of connected mobile devices is less than a maximum allowable number of connected mobile devices; and
      connecting one or more higher access priority mobile devices to the communications network via the access point when the total number of connected mobile devices is at or greater than a maximum allowable number of connected mobile devices.

8. The method of claim 4, wherein the access point is a mobile device personal hotspot provided by another mobile device, and wherein the another mobile device determines the request includes user credentials associated with authorizing the user of the mobile device to use services provided by the communications network during the emergency situation.

9. The method of claim 4, wherein the access point is a wireless router, and further comprising:
displaying an indicator via the wireless router that represents the wireless router has facilitated the connection of the mobile device to the communications network via the wireless router.

10. The method of claim 4, wherein the access point is a wireless router, and further comprising:
changing a display mode of an indicator presented by the wireless router that represents the wireless router has facilitated the connection of the mobile device to the communications network via the wireless router.

11. The method of claim 4, wherein the access point is a wireless router, and further comprising:
transmitting an alert from the wireless router to an emergency response system associated with the communications network that provides information associated with the connection of the mobile device to the communications network via the wireless router during the emergency situation.

12. A non-transitory computer-readable medium whose contents, when executed by a wireless router, cause the wireless router to perform a method for providing a mobile device with access to a communications network during an emergency situation, the method comprising:
receiving, at the wireless router, a request from the mobile device to connect to the communications network via the wireless router;
determining the request includes user credentials associated with authorizing a user associated with the mobile device to use services provided by the communications network during the emergency situation by matching a password within the user credentials with a password stored by the wireless router that is a common password associated with authorizing mobile devices to access points during emergency situations; and
connecting the mobile device to the communications network via the wireless router based on the user credentials.

13. The non-transitory computer-readable medium of claim 12, wherein determining the request includes user credentials associated with authorizing the user associated with the mobile device to user services provided by the communications network during the emergency situation includes matching a password within the user credentials with a password stored by a mesh of wireless routers that is a common password associated with authorizing mobile devices to access points during emergency situations; and
wherein connecting the mobile device to the communications network via the wireless router based on the user credentials includes connecting the mobile device to a wireless router of the mesh of wireless routers.

14. The non-transitory computer-readable medium of claim 12, further comprising:
receiving, at the wireless router, multiple additional requests from multiple additional mobile devices to connect to the communications network;
determining the requests includes user credentials associated with authorizing users associated with the mobile devices to use services provided by the communications network during the emergency situation as well as information identifying priority access levels for the users associated with the mobile devices; and
connecting the multiple additional mobile devices to the communications network via the wireless router and one or more other wireless routers based on the user credentials and based on the identified priority access levels for the users associated with the mobile devices.

15. The non-transitory computer-readable medium of claim 12, further comprising:
displaying an indicator via the wireless router that represents the wireless router has facilitated the connection of the mobile device to the communications network via the wireless router.

16. The non-transitory computer-readable medium of claim 12, further comprising:
changing a display mode of an indicator presented by the wireless router that represents the wireless router has facilitated the connection of the mobile device to the communications network via the wireless router.

17. The non-transitory computer-readable medium of claim 12, further comprising:
transmitting an alert from the wireless router to an emergency response system associated with the communications network that provides information associated with the connection of the mobile device to the communications network via the wireless router during the emergency situation.

* * * * *